United States Patent
Eddings et al.

(10) Patent No.: US 7,788,245 B1
(45) Date of Patent: Aug. 31, 2010

(54) METHOD AND SYSTEM FOR DYNAMICALLY GENERATING SEARCH LINKS EMBEDDED IN CONTENT

(75) Inventors: Jeffrey Kenn Eddings, Danville, CA (US); John Fu, Sunnyvale, CA (US); Grace Kwak, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1279 days.

(21) Appl. No.: 11/156,283

(22) Filed: Jun. 16, 2005

(51) Int. Cl.
*G06F 7/00* (2006.01)
*G06F 17/30* (2006.01)

(52) U.S. Cl. .................. 707/705; 707/755; 707/756
(58) Field of Classification Search .............. 707/2, 707/101, 736, 755, 756, 705, 713, E17.116
See application file for complete search history.

(56) References Cited

U.S. PATENT DOCUMENTS

| | | | | |
|---|---|---|---|---|
| 5,822,720 | A | 10/1998 | Bookman et al. | 704/3 |
| 6,415,294 | B1 * | 7/2002 | Niemi | 1/1 |
| 6,839,702 | B1 | 1/2005 | Patel et al. | 707/3 |
| 2003/0050929 | A1 | 3/2003 | Bookman et al. | 707/7 |
| 2004/0059708 | A1 | 3/2004 | Dean et al. | 707/1 |
| 2005/0004909 | A1 | 1/2005 | Stevenson et al. | 707/5 |
| 2008/0046415 | A1 * | 2/2008 | Henkin et al. | 707/3 |

OTHER PUBLICATIONS

Bookman, M.H., et al., "Dynamic Contextual Linking: The Path Toward Truly Interoperable Web Applications," Sentius Corporation, Nov. 2002.
"RichLink Search & Navigation—Are they looking but not finding?" http://www.sentius.com/nav.pl?page=/products/r1_sn.html, Dec. 2003.
"RichLink Search and Navigation, Products," http://www.sentius.com/nav.pl?page=products/products.html, Jan. 2003.
Product data sheet "RichLink Trio—Map, Tag, and Serve for Better Navigation," Sentius Corporation, www.richlink.com, Jan. 2003.
Neuburg, M., "Richlink Reaches for Hypertext Riches," www.tidbits.com, Jun. 21, 1999.
Bryan, N. W., "Too Close for Comfort?" www.imediaconnection.com, Apr. 8, 2004.
"Vibrant Media," www.vibrantmedia.com/site/web_01a3.html, Jun. 2004.

* cited by examiner

*Primary Examiner*—Don Wong
*Assistant Examiner*—Angela M Lie
(74) *Attorney, Agent, or Firm*—Morgan, Lewis & Bockius LLP

(57) ABSTRACT

A search engine link provider receives content of a document from a remote computer. Topics for the content are identified and search terms are generated based on the topics. Search engine links are generated based on the search terms. The search engine links are embedded into the content for matches within the content to the search terms. Selection of a search engine link by a user initiates a search for the search term associated with the search engine link.

27 Claims, 11 Drawing Sheets

METHOD AND SYSTEM FOR DYNAMICALLY GENERATING SEARCH LINKS EMBEDDED IN CONTENT

TECHNICAL FIELD

The disclosed embodiments relate generally to search-engines. More particularly, the disclosed embodiments relate to embedding search-engine links into documents, such as web pages.

BACKGROUND

Every day, people turn to the World Wide Web (also referred to as the "Web") for information about a wide range of topics. Due to the vast size of the Web, users typically use search-engines to find desired web pages on the Web.

While viewing a web page, a user may require more information about a topic mentioned in the web page. To get that information, the user traditionally opens a search-engine page, types in a search term manually, and initiates the search by pressing enter or clicking on an icon. This can be inconvenient for the user, as it requires navigation to the search-engine page, typing in the search term, and possibly opening a new window. Furthermore, this search process diverts the user's attention to another page. The user may not return to the original web page, thus depriving the web page provider of potential page visits and advertisement impressions or click-throughs. Additionally, the user may not know the best search term(s) to use for finding additional information about the topic.

More recently, some web sites and applications have started including search boxes on their web pages or in the graphical user interfaces of their applications. These search boxes allow a user to search the Web without first opening a new window or navigating to a search-engine page. However, these web sites and applications still require manually typing the search term into the search boxes.

SUMMARY

According to one aspect, a method of processing a document to include embedded search-engine links includes receiving, from a remote computer, content that forms at least a part of a document. One or more search terms are determined based on the content. One or more search-engine links corresponding to at least some of the search terms are generated. The search-engine links are transmitted to the remote computer for embedding into the document.

According to another aspect, a method of embedding search-engine links into a document includes invoking one or more procedures. Content that forms at least a part of a document is transmitted to a remote computer in response to the invoking of the one or more procedures. One or more search-engine links, generated based on one or more search terms associated with the content, are received from the remote computer. The search-engine links are inserted into the document.

According to yet another aspect, a method of embedding search-engine links in a document includes invoking one or more procedures. A first content is transmitted in response to the invoking of the one or more procedures. A second content, including one or more embedded search-engine links that are associated with one or more search terms associated with the first content, are received from the remote computer. The first content in the document is replaced with the second content, including the one or more embedded search-engine links.

BRIEF DESCRIPTION OF THE DRAWINGS

For a better understanding of the aforementioned aspects of the embodiments described herein, reference should be made to the detailed description of the embodiments below, in conjunction with the accompanying drawings. Like reference numerals refer to the same or similar components or operations throughout the figures.

DETAILED DESCRIPTION OF THE EMBODIMENTS

The following description sets out various embodiments for embedding search engine links into a document, such as a web page. This allows a user to quickly access additional information relevant to the topics of the document without manually navigating to a search-engine page and typing a search query.

Figure 1:
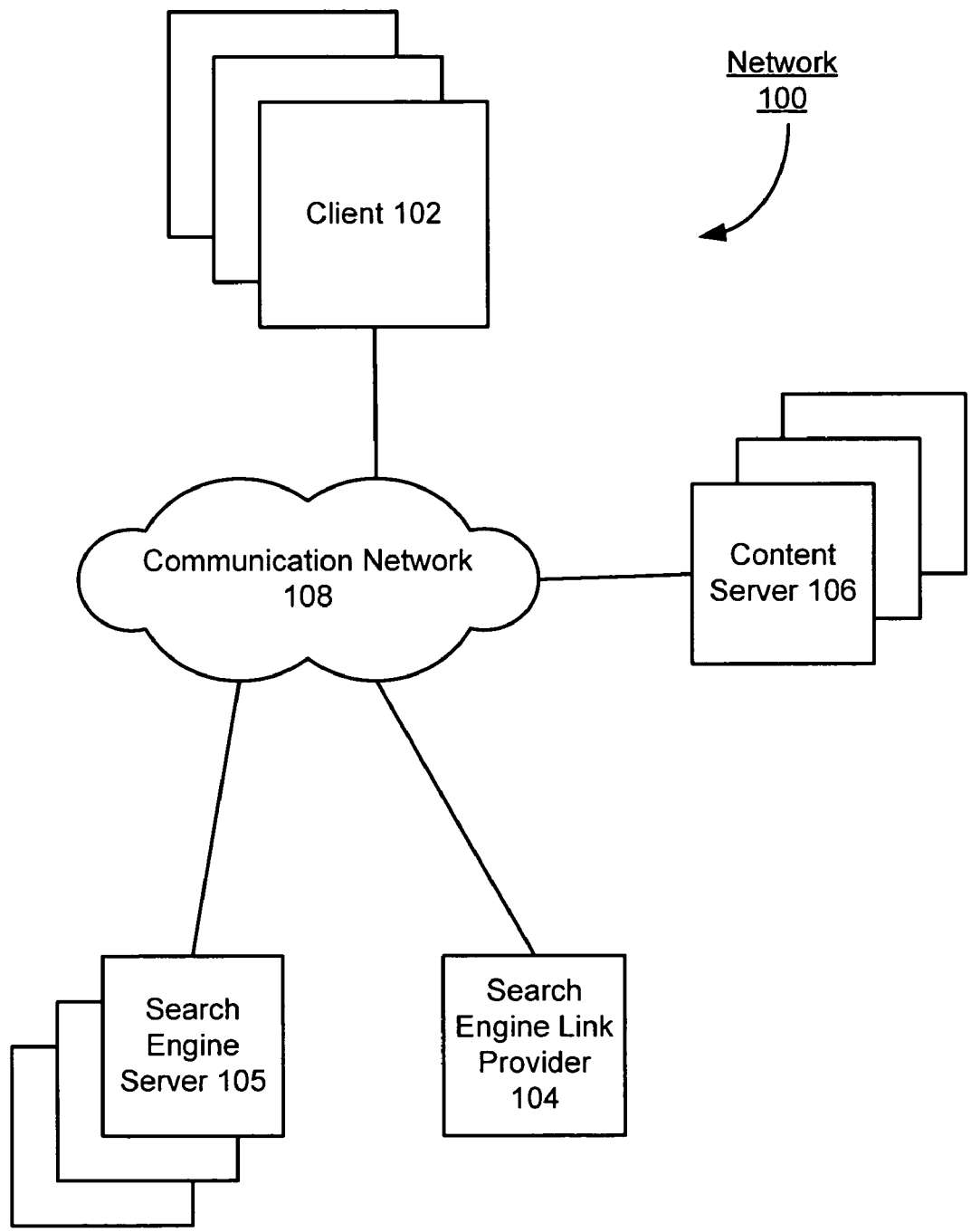
FIG. 1 is a block diagram of a network architecture, according to some embodiments of the invention.

FIG. 1 shows a network architecture 100, according to some embodiments of the invention. The network 100 includes one or more clients 102, at least one search-engine link provider 104, one or more search-engine servers 105, and one or more content servers 106. In some embodiments, the search-engine link provider 104 and search-engine servers 105 may be affiliated and/or operated by a common entity, such as a search-engine provider. The network environment also includes a communication network 108, such as the Internet, that interconnects the aforementioned components.

Figure 2:
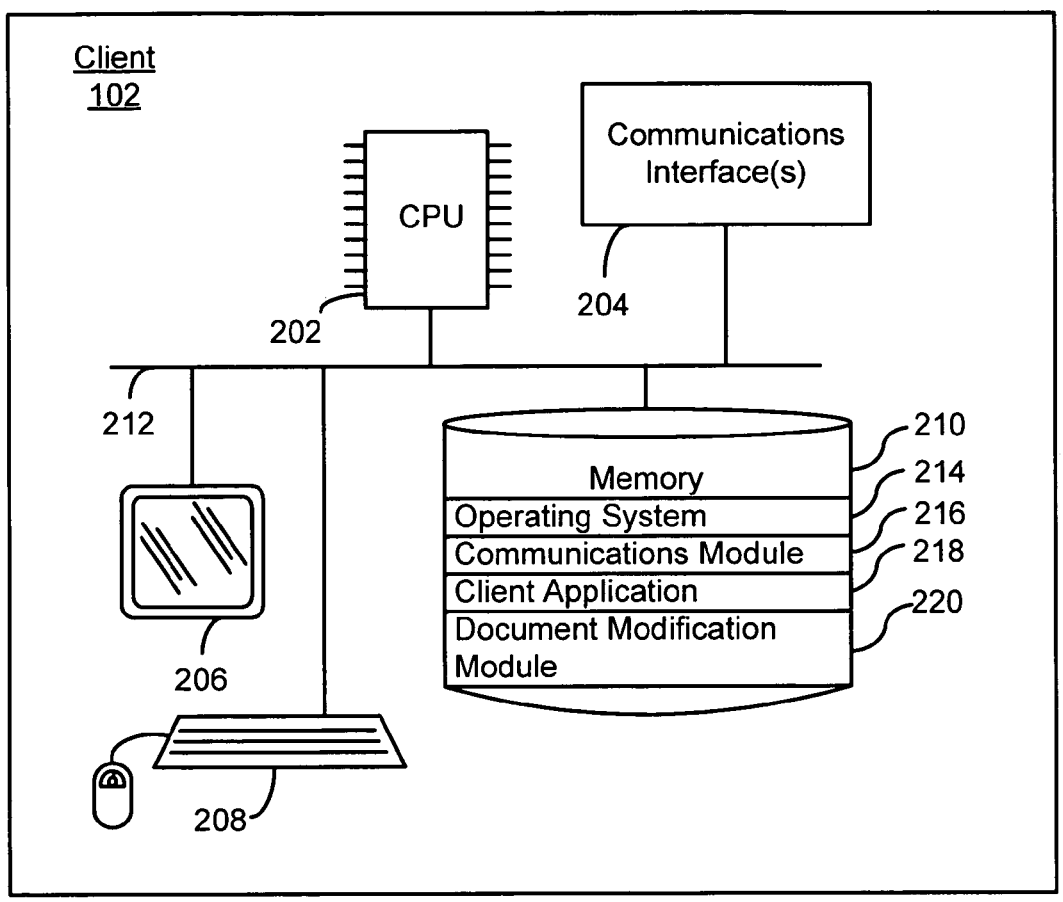
FIG. 2 is a block diagram of the client shown in FIG. 1.

FIG. 2 shows the client 102 from FIG. 1. The client 102 includes: at least one data processor or central processing unit (CPU) 202; memory 210; communications interface(s) 204 for coupling the client to and communicating with other clients, content servers, the search-engine link provider, or search-engine servers in the network 100 (FIG. 1) via the communication networks 108; and at least one bus 212 that interconnects these components. Each client may also include one or more user interface devices, such as a monitor 206 and a keyboard/mouse 208. In some embodiments, the client 102 may include a subset and/or superset of the aforementioned components.

In some embodiments, memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210, or alternatively one or more storage devices (e.g., one or more non-volatile solid state storage devices within memo 210 includes a computer readable storage medium. Memory 210 may optionally include one or more storage devices remotely located from the CPU(s) 202. In some embodiments, memory 210 may include remotely located storage. Memory 210 includes an operating system 214 that includes procedures for handling basic system services and for performing hardware dependent tasks. Memory 210 also includes a communications module 216 having procedures or instructions for communicating with other clients, content servers, the search-engine link provider, and search-engine servers coupled to the network 100 (FIG. 1).

Memory 210 or the computer readable storage medium of memory 210 may also store the following data structures, programs and instructions, or a subset or superset thereof:

- a client application 218, containing procedures or instructions for rendering documents for display to the user; and
- a document modification module 220, containing procedures or instructions for modifying documents to include embedded search-engine links.

The client application 218 renders documents retrieved from content server 106 or search-engine server 105 for display to the user via user interface devices such as monitor 206. Exemplary client application modules 218 may include, without limitation, web browsers, such as Firefox or Internet Explorer. For purposes of this description, a document is any type of machine-readable file that may include any combination of text, graphics, video, audio, etc. In embodiments where the client application module 218 is a web-browser, documents may be web pages written in Hypertext Markup Language (HTML), Extensible Markup Language (XML), or any other suitable language that can be processed by a web browser, and may include any combination of text, graphics, video, audio, hyperlinks (or "links") to other documents, etc. A document may be located and/or identified by its URL (Uniform Resource Locator), i.e., its web address, or any other suitable identifier. For simplicity of explanation, documents are described herein as HTML web pages with text content, but it should be appreciated that the types of documents in which search-engine links may be embedded, in accordance with the disclosed embodiments, are not limited to web pages. Search-engine links may be embedded into many types of documents, including but not limited to instant messaging messages or sessions, Short Message Service (SMS) messages, emails, Portable Document Format (PDF) documents, documents stored in the Microsoft Word format, and so forth. More generally, search-engine links may be embedded into any document that includes text and supports hyperlinks.

In some embodiments, the client 102 also includes a document modification module 220. The document modification module 220 may include a script placed within a document, e.g., a web page, by a content provider and executed at the client 102 when the document is rendered by the client application 218. The script may be written in JavaScript, Perl, or any other suitable scripting language that is capable of execution by the client application 218. If the document modification module 220 includes a script placed within a document, the module is not loaded into memory 210 until the document with the script is rendered and the script is invoked. For example, when a web page containing a JavaScript script (the document modification module) is rendered by a web-browser, the script is invoked and loaded into memory. In alternative embodiments, the document modification module 220 may be loaded into memory 210 by means other than through a script placed within a document.

Each of the above identified modules or procedures correspond to a set of instructions for performing a function described above. These modules need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Figure 3:
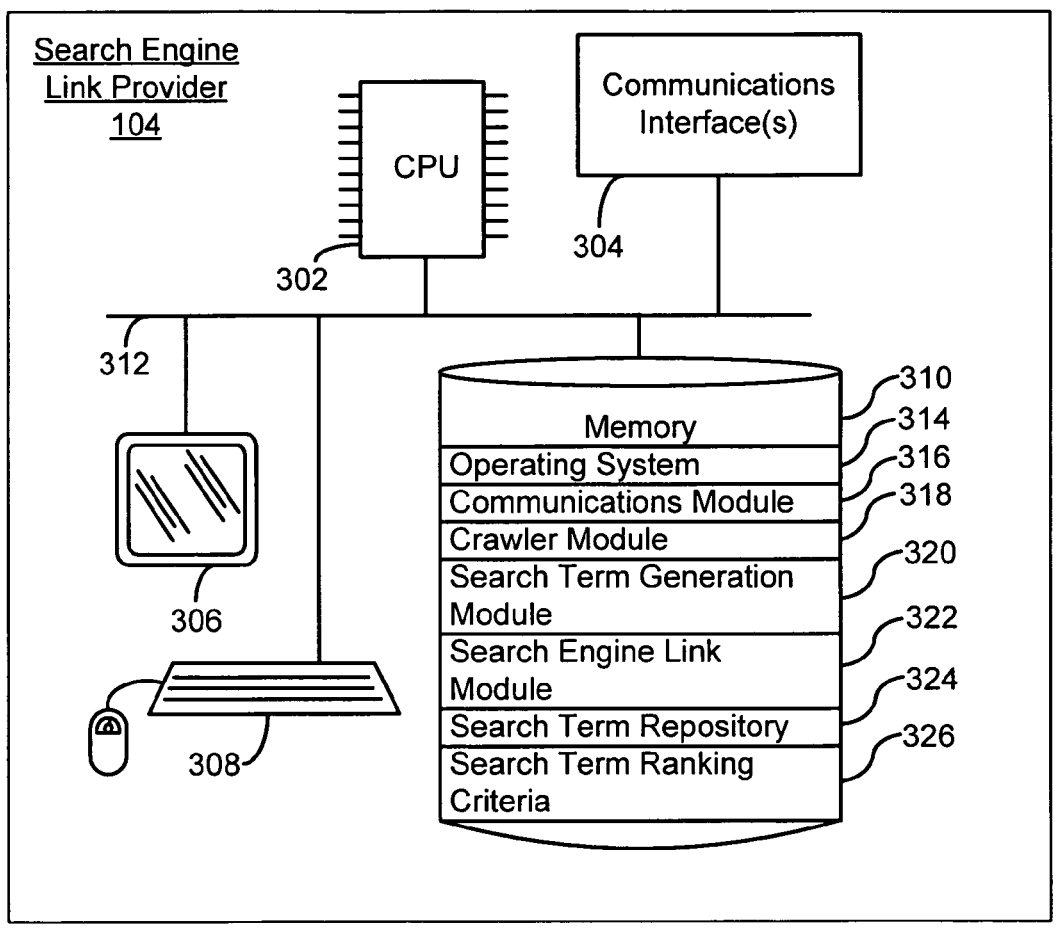
FIG. 3 is a block diagram of the search-engine link provider shown in FIG. 1.

FIG. 3 shows the search-engine link provider 104 of FIG. 1. Search-engine link provider 104 includes: at least one data processor or central processing unit (CPU) 302; memory 310; communications interface(s) 304 for coupling the search-engine link provider to and communicating with clients, content servers, or search-engine servers in the network 100 (FIG. 1) via the communication networks 108; and at least one bus 312 that interconnects these components. Each search-engine link provider may optionally include one or more user interface devices, such as a monitor 306 and a keyboard/mouse 308.

In some embodiments, memory 310 includes high-speed random access memory, such as DRAM, SRAM, DDR RAM or other random access solid state memory devices, as well as non-volatile memory, such as one or more magnetic disk storage devices, optical disk storage devices, flash memory devices, or other non-volatile solid state storage devices. Memory 310, or alternatively one or more storage devices (e.g., one or more non-volatile solid state storage devices) within memory 310, includes a computer readable storage medium. Memory 310 may optionally include one or more storage devices remotely located from the CPU(s) 302. Memory 310 stores an operating system 314 that includes procedures for handling basic system services and for performing hardware dependent tasks. Memory 310 also stores a communications module 316 having procedures or instructions for communicating with clients, content servers, and search-engine servers coupled to the network 100 (FIG. 1).

Memory 310 or the computer readable storage medium of memory 310 may also store the following data structures, programs and instructions, or a subset or superset thereof:

- a crawler module 318, having procedures or instructions for pre-crawling documents for processing by the search term generation module;
- a search term generation module 320, having procedures or instructions for analyzing content from a document, identifying one or more topics for the content, generating search terms based on those one or more topics, and ranking the search terms based on one or more pre-defined criteria;
- a search-engine link module 322, having procedures or instructions for generating search-engine links from search terms generated by the search term generation module 320, and modifying documents to include search-engine links;
- a search term repository 324, for storing generated search terms, and
- search term ranking criteria 326, containing data used to rank search terms generated by the search term generation module 320.

Each of the above identified modules or procedures correspond to a set of instructions for performing a function described above. These modules need not be implemented as separate software programs, procedures or modules, and thus various subsets of these modules may be combined or otherwise re-arranged in various embodiments. In some embodiments, memory 310 may store a subset of the modules and data structures identified above. Furthermore, memory 310 may store additional modules and data structures not described above.

Although FIG. 3 shows the search-engine link provider 104 as a number of discrete items, FIG. 3 is intended more as a functional description of the various features which may be present in search-engine link provider 104 rather than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers in search-engine link provider 104 and how features are allocated among them will vary from one implementation to another, and may depend in part on the amount of data traffic that the system must handle during peak usage periods as well as during average usage periods.

Figure 4:
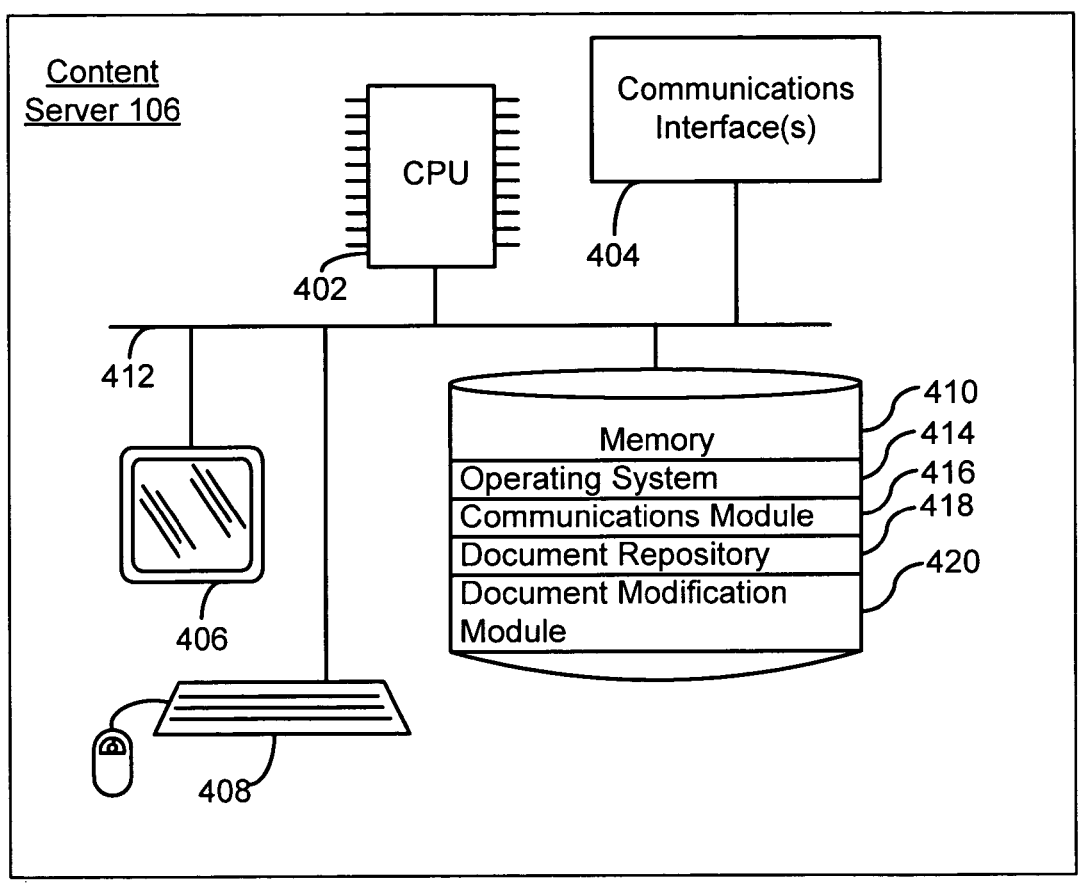
FIG. 4 is a block diagram of the content server shown in FIG. 1.

FIG. 4 illustrates an exemplary content server 106, according to some embodiments of the invention. Content server 106 includes: at least one data processor or central processing unit (CPU) 402; memory 410; communications interface 404 for coupling the content server to and communicating with clients, other content servers, the search-engine link provider, or search-engine servers in the network 100 (FIG. 1) via the communication networks 108; and at least one bus 412 that interconnects these components. Each content server may optionally include one or more user interface devices, such as a monitor 406 and a keyboard/mouse 408.

Memory 410 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 410, or alternatively one or more storage devices (e.g., one or more non-volatile solid state storage devices) within memory 410, includes a computer readable storage medium. Memory 410 may optionally include one or more storage devices remotely located from the CPU(s) 402. Memory 410 stores an operating system 414 that includes procedures for handling basic system services and for performing hardware dependent tasks. Memory 410 also stores a communications module 416 containing procedures or instructions for communicating with clients, other content servers, search-engine servers, and the search-engine link provider on the network 100 (FIG. 1).

Memory 410 or the computer readable storage medium of memory 410 may also store the following data structures, programs and instructions, or a subset or superset thereof:
- a document repository 418, for storing documents for access by users; and
- a document modification module 420, for modifying documents stored in document repository 418 to include embedded search-engine links.

In some embodiments, content server 106 includes a document modification module (or instructions) 420. However, document modification module 420 is different from the document modification module 220 (FIG. 2) on client 102 (FIG. 1), in that document modification module 420 is generally not a script placed within a document and run upon rendering of the document, but is rather invoked once a document is created and before it is made available to users.

Each of the above identified modules or procedures correspond to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Although FIG. 4 shows content server 106 as a number of discrete items, FIG. 4 is intended more as a functional description of the various features which may be present in content server 106 rather than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The document modification module 420 may be implemented by one or more servers that are distinct from the servers that implement the document repository 418. The actual number of servers in content server 106 and how features are allocated among them will vary from one implementation to another, and may depend in part on the amount of data traffic that the system must handle during peak usage periods as well as during average usage periods.

Figure 5A:
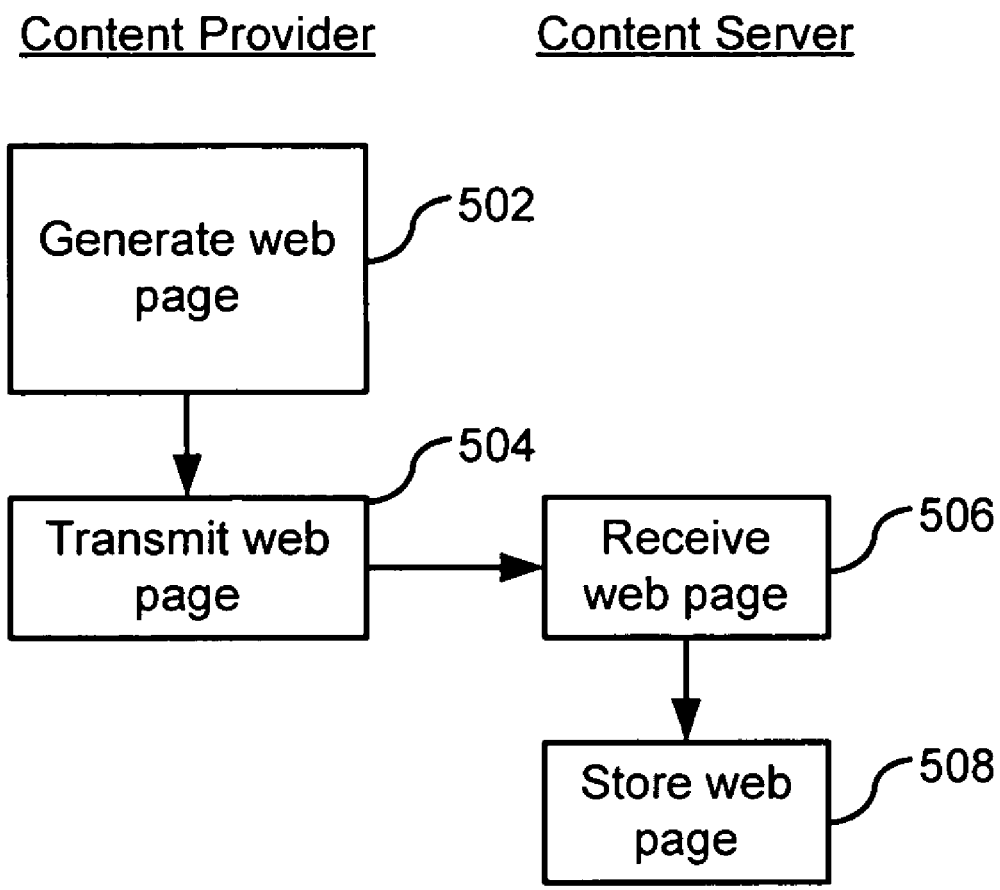
FIG. 5A is a flowchart of a process for publishing a document that is configured to accept embedded search-engine links, according to some embodiments of the invention.

FIG. 5A illustrates an exemplary process for online publishing of a document that is configured to accept embedded search-engine links, according to some embodiments of the invention. Initially, a content provider, e.g., a web site publisher, generates a document at a computer at 502. In some embodiments, the content provider may designate certain parts of the document for receiving embedded search-engine links. For example, if the document is a web page that includes a text article, a navigation bar of links, and other miscellaneous text, the content provider may include information in the document to indicate that only the text article should have search-engine links embedded therein. In some embodiments, this may be achieved by incorporating into the document special tags that enclose the designated content. However, it should be appreciated that the designated content may also be the whole document or any portion thereof. In other words, in some embodiments, the content provider controls the designation of the content of the document by the placement of the special tags.

As described above, the content provider may positively designate certain parts of the document for receiving embedded search-engine links. In some embodiments, the content provider may negatively designate certain parts of the document to prevent embedding of search-engine links into the designated parts. For example, the content provider may not wish to have search-engine links embedded in an author description or in a copyright notice. Similar to the positive designation above, the negative designation may also be achieved by incorporating into the document special tags that enclose the designated content.

Furthermore, in some embodiments, the content provider may negatively designate certain search terms and/or topics to prevent embedding of search-engine links into the content of the document associated with the designated topics and/or including the designated search terms. As described below, in relation to FIGS. 5B-7B, search-engine links may be embedded into a document by identifying one or more topics for the content of the document and generating search terms based on the identified topic(s). However, the content provider may not want search-engine links embedded for particular topics and/or terms within the content. For example, the content provider may not want to have in the document search-engine links related to particular sensitive or negative topics. As another example, the content provider may not want search-engine links embedded for terms related to competitors of the content provider. Thus, some embodiments may include a manner of negatively designating particular topics or terms. The content provider may list the designated terms and/or topics in the document. Alternatively, the content provider may list the designated terms and/or topics in a separate file, and include a reference to the file in the document.

In some embodiments, the content provider may also include a script, which is the document modification module 220, in the document. The script, when invoked at the client 102 (FIG. 1), loads the document modification module 220 (FIG. 2) into memory 210 (FIG. 2) of the client 102. The document modification module 220 embeds search-engine links into the document when the document is accessed by the client 102.

After the document is generated by a content provider at 502, it is transmitted to the content server 106 (FIG. 1) for publication on the Web at 504. The content server 106 receives the document at 506 and stores the document in the document repository 418 (FIG. 4) at 508. Once stored in the document repository 418, the document may be accessed by other computers, such as the client 102 (FIG. 1) and the search-engine link provider 104 (FIG. 1).

Figure 5B:
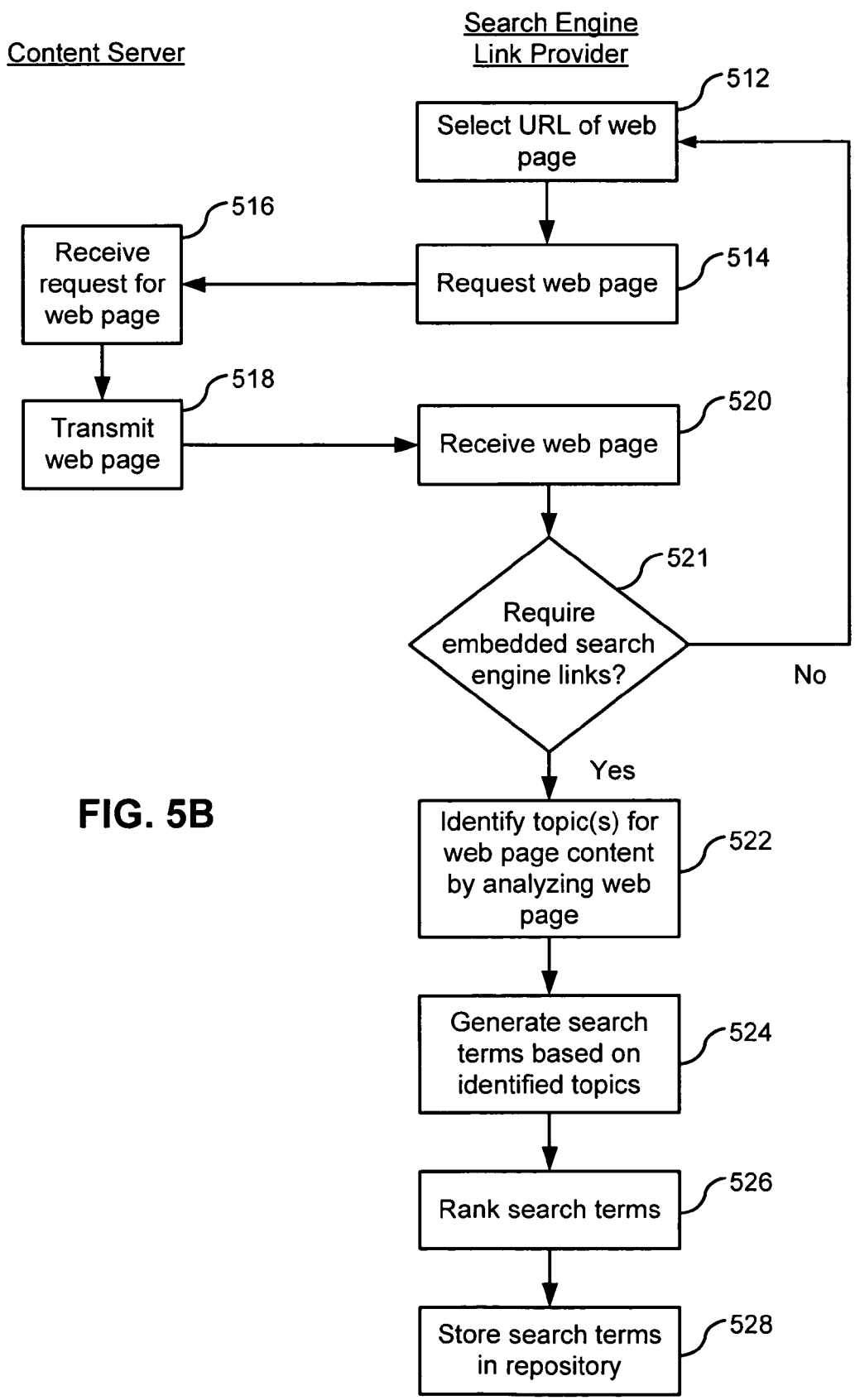
FIG. 5B is a flowchart of a process for pre-crawling documents configured to accept embedded search-engine links, according to some embodiments of the invention.

FIG. 5B illustrates an exemplary process for pre-crawling the Web for documents that require embedding of search-engine links (e.g., documents that include content designated for embedding search-engine links), according to some embodiments of the invention. After a document, e.g., a web page, with content that has been designated to receive embedded search-engine links is published on the Web, according to the process described in relation to FIG. 5A, it may be processed by the search-engine link provider 104 (FIG. 1) before it is requested by a client 102 (FIG. 1). A crawler module 318 (FIG. 3) of search-engine link provider 104 can automatically browse documents stored in the document repository 418 (FIG. 4) and locate the documents that include content that requires embedded search-engine links.

Initially, a crawler module 318 (FIG. 3) selects the address of a document located on content server 106 (FIG. 1) at 512. The address may originate from a link in a document the crawler has already browsed, or the address may be automatically generated by the crawler module 318, such as from top level domain names. Once the address has been selected at 512, the crawler module 318 requests the document from content server 106 at 514. Content server 106 receives the request at 516, and transmits the document to search engine link provider 104 in response to the request, at 518. The crawler module 318 then receives the document at 520. If the document does not have content that requires embedded search-engine links (521—no), the crawler module 318 stops processing that document and proceeds to the next document.

If the document has content that requires embedded search-engine links (521—yes), then the search term generation module 320 (FIG. 3) of the search-engine link provider 104 (FIG. 1) identifies one or more topics associated with the document at 522. This is achieved by analyzing the content that requires embedded search-engine links. If the content is textual, the content can be analyzed by various techniques, such as keyword extraction and frequency analysis, and the like. For example, if a text article is about a pet show and mentions dogs and cats, the analysis may identify the topics of pets, dogs, and cats. Examples of exemplary techniques for identifying one or more topics for the content of a document are disclosed in U.S. Patent Application Publication No. 2004/0059708 A1, titled "Methods And Apparatus For Serving Relevant Advertisements," filed Dec. 6, 2002, and listing Jeffery A. Dean et al. as inventors, which is expressly incorporated herein by reference. Other techniques may be used for other types of content such as graphics, audio, and video. For example, a graphics identifier may determine that the document includes numerous images of dogs and cats. In some embodiments, the parts of the document that have not been designated as requiring embedded search-engine links may nevertheless be analyzed as part of the topic identification process.

After one or more topics for the content and/or document have been identified at 522, one or more search terms are generated based on those topic(s) at 524. The search terms are words or phrases that are related to the one or more topics identified for the document. The search terms may be used as inputs into a search-engine to retrieve further information on the associated topics and/or any sub-topic thereof. Thus, using the example of the pet show article described above, search terms generated for the topic of dogs may include "Golden Retriever," "Labrador," and other terms corresponding to various breeds of dogs, "dog," "dog food," "dog leash," "dog show," "obedience training," etc. Search terms generated for the topic of cats may include terms corresponding to various breed of cats (e.g., "Siamese cat," "Persian cat," "Burmese cat"), "cat," "cat food," etc. Search terms generated for the topic of pets may include "pet food," "pet supplies," "pet grooming," etc. The set of generated search terms may include words and/or phrases that appear in the content and/or those that do not. For example, using the example of the pet show article described above, if the article mentions "Golden Retriever" explicitly but not "dog food," the search terms "Golden Retriever" and "dog food" may both be generated. Search term generation module 320 (FIG. 3) can generate as many search terms as it is able to identify, or the number of search terms may be limited to a predefined number.

In some embodiments, after the search terms are generated, they are ranked according to predefined criteria 326 (FIG. 3) at 526. The predefined criteria may include a metric of a search term's relevancy to the topic or the content, advertisement revenue generation potential of a search term, whether there is a large number of recent news items associated with the topic associated with the search term, whether the topic associated with the search term is popular with users who have accessed other documents provided by the content provider, etc. Furthermore, any combination and weighting of the criteria described above may be used. The data that are used in the ranking process, such as the relevancy metrics or parameters that indicate a search term's advertisement revenue generation potential, may be retrieved from search term ranking criteria 326 (FIG. 3), or determined as needed.

The relevancy metric is a measure of how closely a search term corresponds to the topics identified for the content. Using the example of the pet show article, a search term "cheshire cat" may be less relevant, and thus have a lower relevancy metric, than the term "Siamese cat" because the term "Siamese cat," which refers to the cat breed, corresponds more closely to the topics identified for the article (a pets, cats, dogs) than the term "cheshire cat," which refers to a fictional character. Rankings based on relevancy help to single out the search terms that may lead the most relevant additional information when used as inputs into a search-engine.

The advertisement revenue generation potential of a search term may be used as a ranking criterion if the search-engine server 105 (FIG. 1) displays advertisements based on the search term in its search results pages. An example of a service that displays advertisements alongside search results is Adwords by Google Inc. In some embodiments, a content provider who publishes documents with content that requires embedded search-engine links may be compensated based on the number of user click-throughs of advertisements displayed alongside search results generated as a result of a user selecting a search-engine link embedded within a document published by the content provider. Thus, some content providers may be interested in maximizing the amount of compensation they can receive from such click-throughs. Rankings based on advertisement revenue generation potential help to single out search terms that can maximize the potential compensation to a content provider. The advertisement revenue generation potential may be based on the number of advertisements available for display in a search results page for a search term, the highest cost-per-click amongst advertisements available for display in a search results page for a search term, etc. It should be appreciated that any number of these bases, in any suitable combination and weighting, may be used for determining the advertisement revenue generation potential of a search term.

In some embodiments, the advertisement revenue generation potential of a search term may be based on the past revenue performance of the search term when it was embedded as a search-engine link. The past revenue performance of a search term may be based on (1) the click-through rate for advertisements displayed along with search results generated from search-engine links embedded using the search term and (2) the average cost-per-click for advertisements displayed along with search results generated from search-engine links embedded using the search term. Using these two factors, the past revenue performance of the search term, when embedded as a search-engine link, may be calculated and used as an estimate of the advertisement revenue generation potential of the search term. In some other embodiments, the past revenue performance measure may be further refined by including the click-through rate of search-engine links embedded using the search term as part of the calculation. The click-through rate may be based on click-throughs in the particular document or click-throughs in all documents within a predefined set (such as all web pages within a website that include a search-engine link with the search term, or all web pages across multiple websites that include a search-engine link with the search term).

After the generated search terms are ranked, they may be stored in the search term repository 324 (FIG. 3) at 528. While stored in the search terms repository 324, the search terms may be retrieved for use in the generation of search-engine links for the document for which the search terms were generated. In some embodiments, search-engine link provider 104 (FIG. 1) may choose to store only a subset of the search terms that are ranked above a predefined threshold. Furthermore, the search terms may be stored along with an identifier of the document (e.g., the URL of the document), the last modification date of the document, and the date the search terms were generated. In some embodiments, the dates may be used to determine if the search terms generated for a document have become outdated (e.g., because the content of the document has changed) and thus necessitating re-generation of search terms for the document's content.

In some embodiments, the search term generation operation 524 and ranking operation 526 may be merged. In other words, search terms may be generated based on the topics identified for the document, with the predefined criteria, such as relevancy and advertisement revenue generation potential, taken into account. Thus, a potential search term's relevancy, etc. may be considered during the generation process, and generation of a search term may be suppressed or blocked if, for example, its relevancy is below a predefined threshold.

Figure 6A:
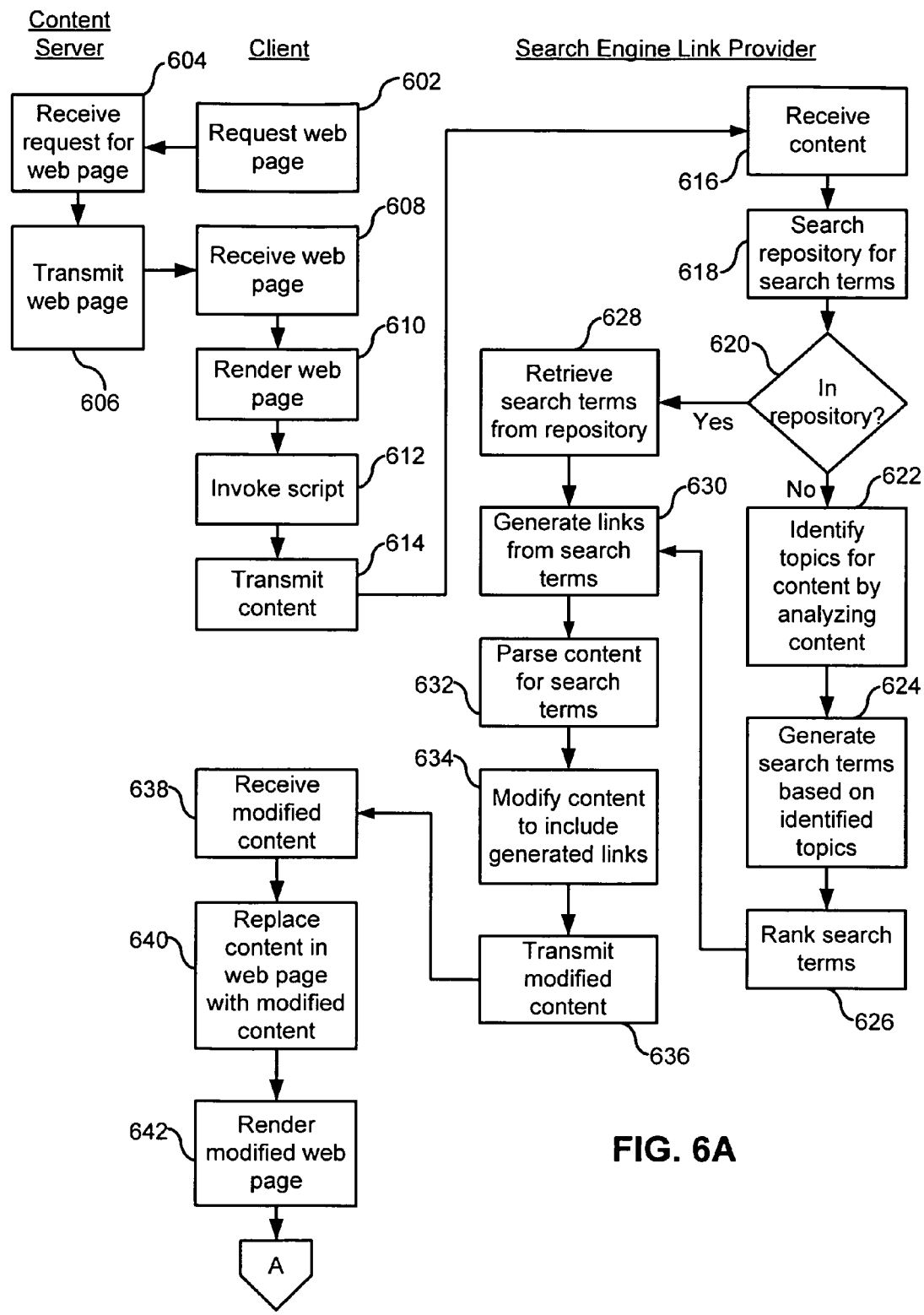
FIGS. 6A-6B are flowcharts of processes for "on-the-fly" embedding of search-engine links into a document, according to some embodiments of the invention.
Figure 6B:
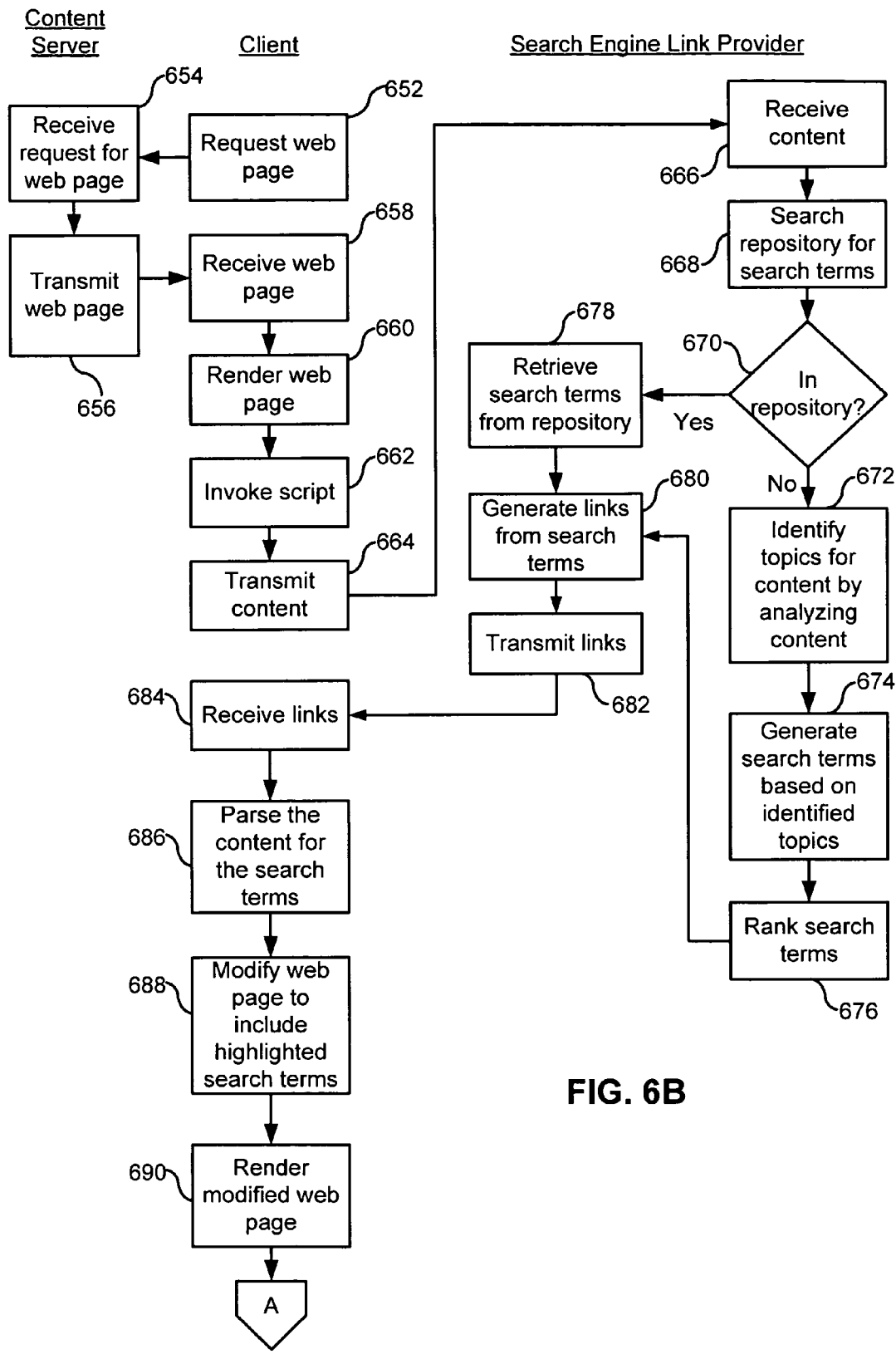

FIGS. 6A-6B illustrate processes for "on-the-fly" embedding of search-engine links into a document, e.g., a web page, according to some embodiments of the invention. "On-the-fly," as used herein, refers to the embedding of search-engine links into a document as they are requested by the client 102, as opposed to the pre-embedding of search-engine links, further details of which are described below in relation to FIGS. 7A-7B.

In FIG. 6A, after the content provider has published a web page with content that requires or enables embedded search-engine links (e.g., a web page that includes content designated for embedding search-engine links), the client 102 (FIG. 1) requests the web page from content server 106 (FIG. 1) in response to a user's request for the web page, e.g., by clicking on a link to the web page, at 602. The content server 106 receives the request for the web page at 604. The content server 106 retrieves the web page from its document repository 418 (FIG. 4) and transmits it to the client 102 at 606. The web page may include tags that designate content to receive embedded search-engine links. The document may also include a document modification module 220 in the form of a script, such as a JavaScript. Client 102 receives the document from the content server 106, at 608, and the client application 218 (FIG. 2) begins rendering the document at 610. The client application 218 then invokes the document modification module 220 (FIG. 2), e.g., the script, at 612. This causes the document modification module 220 to transmit the designated content from the document to the search-engine link provider 104 at 614.

The search-engine link provider 104 (FIG. 1) then receives the content from client 102 (FIG. 1), at 616. The content includes all designated content that is between the special tags, including any HTML markup text and URLs included therein. The search-engine link provider 104 (FIG. 1) then searches in the search term repository 324 (FIG. 3) for search terms already generated for the particular designated content, if any, at 618. If the search terms are in the repository (and in some embodiments, if the search terms are not outdated) (620—yes), then they are retrieved from the search term repository 324 at 628. If search terms for the designated content are not in the repository, or in some embodiments, are outdated (e.g., because the content has changed since the last search term generation for the content) (620—no), search term generation module 320 (FIG. 3) identifies topics for the content at 622, generates search terms based on the content at 624, and ranks the generated search terms at 626. Operations 622, 624, and 626 are the same as or similar to operations 522, 524, and 526 of FIG. 5B, respectively, as described above. After 626, the search-engine link provider 104 may store the search terms (not shown), as in 528 (FIG. 5B).

After the search terms are retrieved from the search term repository 324 or generated and ranked, the search-engine link module 322 (FIG. 3) uses the search terms (or a subset thereof) to generate corresponding search-engine links at 630. A search-engine link is a link to a document (hereinafter "search results") that displays the results of a search for the corresponding search term, using the search-engine server 105. In some embodiments, the search-engine link is an HTML anchor tag that includes the search term and a URL to the corresponding search results.

In some embodiments, the URLs for search results follow a common structure. For example, a search results URL may include the URL for the search-engine server 105, followed by one or more parameters for the search-engine server 105 (FIG. 1), with the word(s) of the search term as one of the parameters. For example, the search results for the search term "golden retriever" on the Google search-engine (by Google Inc.) may have the URL: "http://www.google.com/search?hl=en&lr=&q=golden+retriever". The URL for the search-engine server is "http://www.google.com/", and the parameters for the search are "search?hl=en&lr=&q=golden+retriever". The words "golden" and "retriever" are one of the parameters in the URL (with multiple words connected by plus signs). Thus, different search terms may be inserted into that parameter in the URL to form the search results URL. Thus, one can replace the words "golden" and "retriever" with "scottish" and "terrier", respectively, in the URL example above to obtain the search results URL for the term "scottish terrier", with the URL "http://www.google.com/search?hl=en&lr=&q=scottish+terrier". The search-engine link module 322 inserts the search term into the URL and combines the URL with the appropriate HTML tags to form the search-engine link. For example, the HTML anchor tags for a search-engine link for the search term "golden retriever" may be "<A href="http://www.google.com/search?hl=en&lr=&q=golden+retriever">Golden Retriever</A>". In some embodiments, additional parameters may be included with the anchor tag to specify the appearance (e.g., font, color, highlighting, underlining, etc.) of the link to the user. This can help visually differentiate the search-engine link from other hyperlinks in the content. For example, the search-engine link, as seen by the user, may be double underlined, highlighted, or placed next a special icon. For example, the document, after the search engine link for "golden retriever" is embedded within, may have text that looks like " . . . . Golden Retrievers, . . . "

It should be appreciated, however, that the search-engine link URL examples described above are merely exemplary and the search engine links may be embedded in any suitable manner. The exact format of the URL may vary depending, at least in part, on the type of search for which the search-engine link is made, which can affect the parameters needed for the search results URL.

Once the links are generated, the content is parsed to find matches for the search terms at 632. If a search term is located in the content, the content is modified to highlight the search term with a search-engine link at 634. In some embodiments, the modification replaces the search term in the HTML markup of the content with the HTML anchor for the search-engine link. In some embodiments, a search term that is already a link to another document can be recognized, e.g., by recognizing the presence of the relevant HTML tags near the search term, and that instance (or all instances) of that search term is bypassed, i.e., not converted to a search-engine link. In some embodiments, search term matches to text that is not intended to be displayed to a user, e.g., text that is part of an HTML tag and used as such or text that is part of a comment, is recognized and bypassed.

In some embodiments, the ranking of search terms may be performed after the content is parsed for matches for the search terms, rather than before. The search terms are generated, as described above. Then, the content is parsed to find matches to the search terms. After the matches are found, the search terms for which there are matches in the content are ranked, according to the criteria described above. By ranking search terms after matching, as opposed to before matching, the possibility that high ranking search terms do not match any terms in the content is eliminated.

Furthermore, in some embodiments, the content provider can specify, in tags or tag attributes in the content, a maximum number of search-engine links to be embedded per search term. For example, the content provider can specify that only two instances of any one search term may have embedded search-engine links. This may help to reduce link clutter in the content. In some embodiments, the parsing and search term matching operations may support matching for different forms of the same word. For example, a search term that is a noun in the singular form can match the plural form of the same noun in the text, or a search term that is a verb in the present tense matches the past tense or gerund forms of the same verb. In some embodiments, the search term matching may be case insensitive.

After the content is modified to include the links, the modified content, i.e., the content including the search-engine links, is transmitted to the client 102 (FIG. 1) at 636. The client 102 receives the modified content at 638. The document modification module 220 (FIG. 2) replaces content in the document previously received by the client with the modified content at 640. The document with the modified content is rendered in client application 218 (FIG. 2), e.g., by an automatic refresh, at 642. For example, the pet show article described above may have the text that reads " . . . . Golden Retrievers, . . . " before the refresh, and that reads " . . . . Golden Retrievers, . . . " after the refresh. After the document with the modified content is rendered, a user of client 102 can interact with the search-engine links within the document, further details of which are described in relation to FIG. 8.

FIG. 6B illustrates another process for "on-the-fly" embedding of search-engine links into a document, according to some embodiments of the invention. In FIG. 6B, operations 652-680 are the same as operations 602-630 of FIG. 6A, as described above, and accordingly, will not be further described. After the search-engine links are generated at 680, the search-engine links are sent to the client 102 at 682.

The client 102 (FIG. 1) receives the search-engine links at 684. The document modification module 220 (FIG. 2) then parses the content within the document for matches to the search terms at 686. It should be appreciated that at 680, sending the search terms along with the set of search-engine links is optional, as the search-engine links already have the search terms included within the links. The document modification module 220 can extract the search terms from the links themselves. The document is then modified to embed the search-engine links into the content at 688. The document is modified by replacing the matching search terms within the content of the document with HTML anchors of the corresponding search-engine links. Once the content has been modified, the modified document is rendered in the client application 218 (FIG. 2) at 690. After the modified document is rendered, a user of client 102 can interact with the search-engine links within the document, further details of which are described in relation to FIG. 8.

Figure 7A:
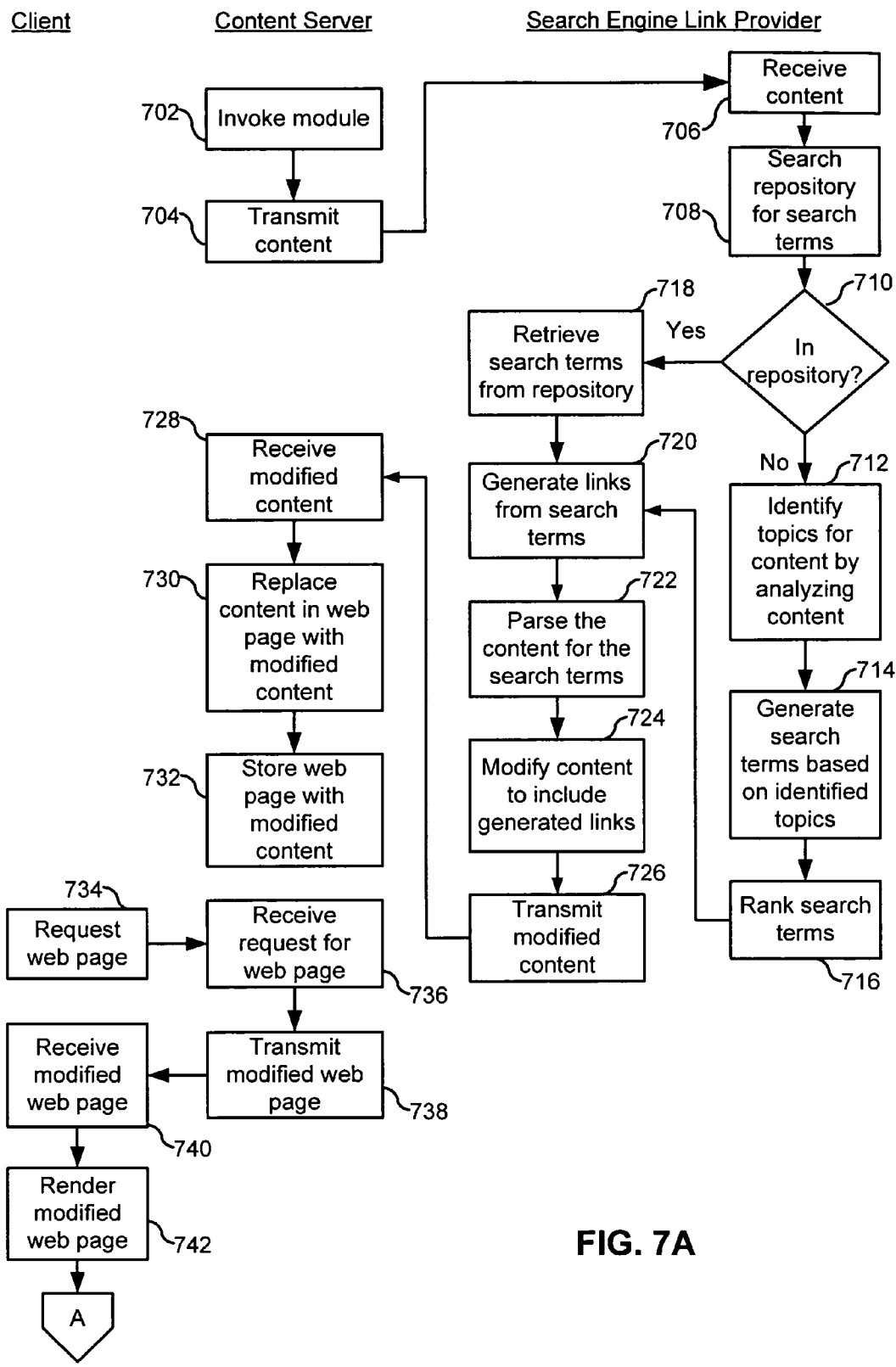
FIGS. 7A-7B are flowcharts of processes for embedding search-engine links into a document in advance of a request for the document by a client, according to some embodiments of the invention.
Figure 7B:
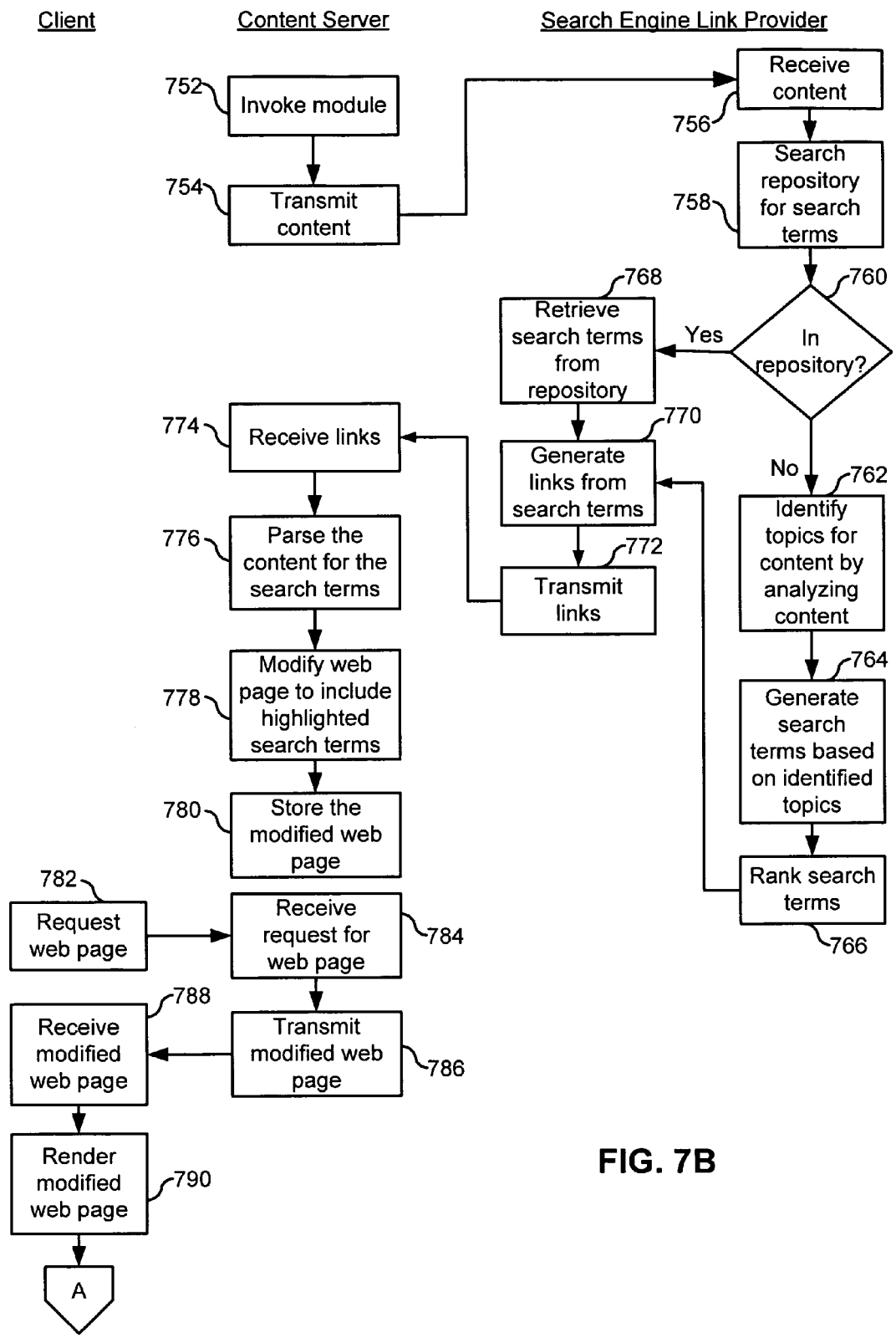

FIGS. 7A and 7B illustrate processes for embedding search-engine links into a document in advance of a client's request for the document, according to some embodiments of the invention. By embedding the search-engine links in advance of a request for the document, the search-engine links will already be in the document when a client requests the document.

After a document with content that requires embedded search-engine links is created and published, which can be accomplished using the process of FIG. 5A, the content server 106 invokes the document modification module 420 (FIG. 4) at 702. Document modification module 420 may be invoked periodically or as needed (e.g., after a document is first published or after a new version of the document is published). The document modification module sends the content of a document to be modified to the search-engine link provider 104 (FIG. 1) at 704. The document is one of the documents stored in the document repository 418 (FIG. 4). The search-engine link provider 104 receives the content at 706. The search-engine link provider 104 searches the search term repository 324 for search terms corresponding to the document (or the document's designated content), at 708. If the search term repository contains search terms for the document (710—yes), then they are retrieved from the search term repository at 718. If the search term repository does not have search terms for the document (710—no), one or more topics are identified for the document at 712, search terms are generated based on the identified topics at 714, and the generated search terms are ranked at 716. Optionally, the generated search terms may be stored in the search term repository 324, as in operation 528 (FIG. 5B).

Search-engine links are then generated from the generated or retrieved search terms at 720. The content is parsed for the search terms at 722, and the search-engine links are embedded into the content by modifying the content at 724. Operations 708-724 are similar to operations 618-634 of FIG. 6A, as described above, and accordingly, will not be further described. After the links are embedded into the content, the content including the search-engine links are sent to the content server 106 at 726.

The content server 106 (FIG. 1) receives the modified content with the search-engine links at 728. The document modification module 420 (FIG. 4) replaces the content in the document with the modified content at 730, in a manner similar to operation 640 of FIG. 6A. The document with the modified content is stored in the document repository 418 (FIG. 4) at 732, replacing the original document.

Some time thereafter, a user will request the modified document (e.g., by clicking on a link for the web page), which has the same address as the original document but now includes the embedded search-engine links. When the user requests the document, client 102 (FIG. 1) requests the modified document from the content server 106 (FIG. 1) at 734. The content server 106 receives the request at 736 and sends the modified document to the client 102 at 738. The client 102 receives the modified document at 740. The client 102 renders the modified document in the client application 218 (FIG. 2) at 742. The user may interact with the embedded search-engine links within the modified document, further details of which are described below in relation to FIG. 8.

FIG. 7B illustrates another process for embedding search-engine links into a document in advance of a client's request for the document, according to some embodiments of the invention. Operations 752 to 770 are similar to operations 702-720 of FIG. 7A, and need not be further described. After the search-engine links are generated at 770, they are sent to the content server 106 (FIG. 1) at 772.

The content server 106 (FIG. 1) receives the links at 774 and proceeds to parse the content in the document for the search terms at 776, similar to operation 686 of FIG. 6B. The document is modified to embed search-engine links in the content at 778, similar to operation 688 of FIG. 6B. The modified document, including the embedded search-engine links, is stored in the document repository 420 (FIG. 4) at 780, similar to operation 732 of FIG. 7A. After storage, the modified document can be requested by client 102 (FIG. 1) at 782. The content server 106 receives the request at 784 and sends the modified document to the client 102 at 786. The client 102 receives the modified at 788, and the document is rendered by the client application 218 at 790. Operations 782-790 are similar to operations 734-742 of FIG. 7A, and need not be further described. A user may then interact with the embedded search-engine links in the rendered document, further details of which are described below in relation to FIG. 8.

Figure 8:
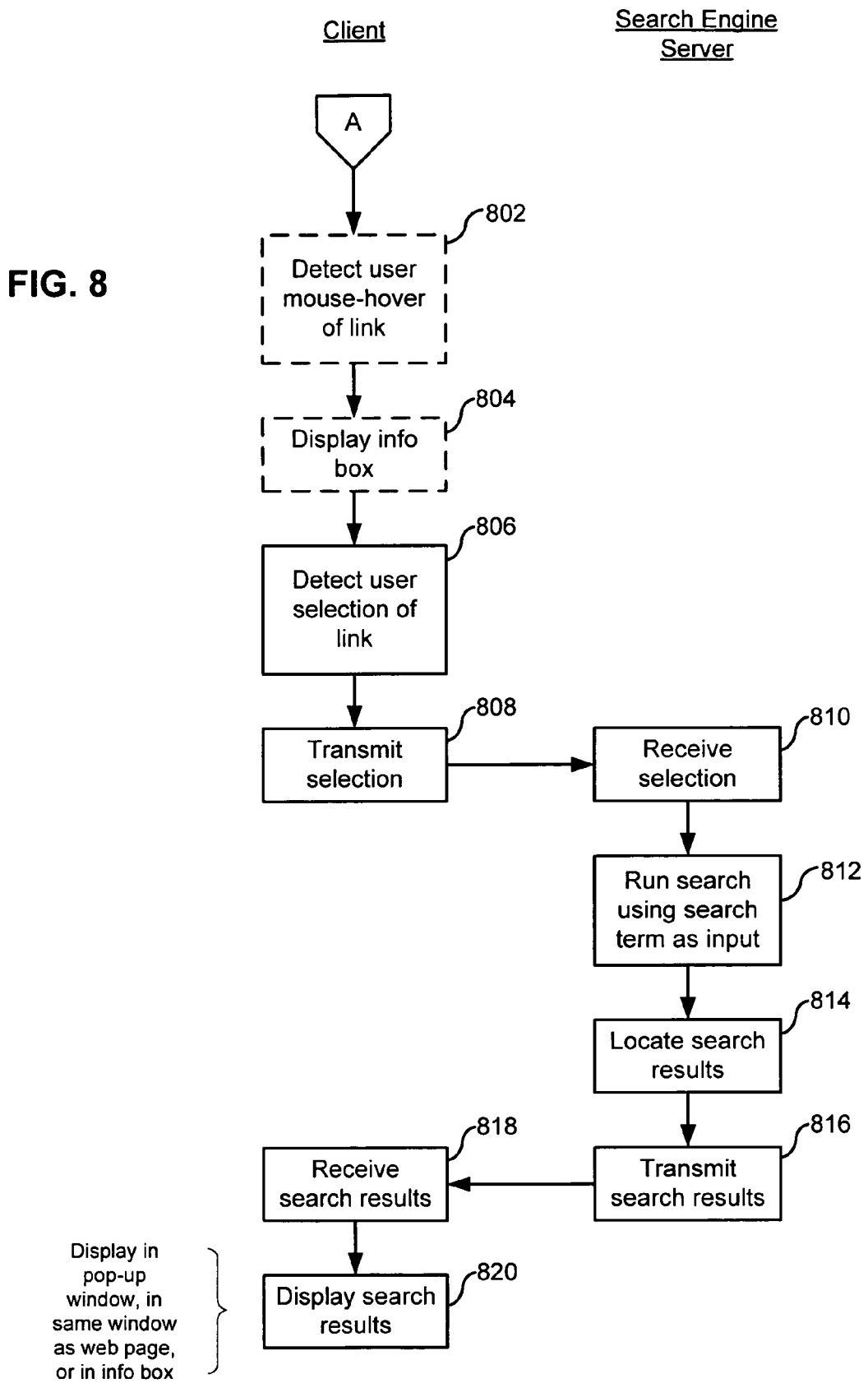
FIG. 8 is a flowchart of a process for handling user interaction with an embedded search-engine link, according to some embodiments of the invention.

FIG. 8 illustrates a process for handling user interaction with an embedded search-engine link, according to some embodiments of the invention. Continuing from FIG. 6A, 6B, 7A, or 7B, after a document with embedded search-engine links is rendered in the client application 218 (FIG. 2), a user can hover a mouse pointer or cursor (hereinafter "mouse hover") over any of the embedded search-engine links. In some embodiments, the mouse hover may trigger the displaying of information about the search-engine link. The mouse hover is detected by the client application 218 at 802, and an information box is displayed in response to the mouse hover at 804. The information box and the information contained therein may be associated with the search engine link during the search engine link embedding processes described above. In some embodiments, the information box is displayed only if the mouse hover lasts longer than a predefined time threshold. In some embodiments, the time threshold is between one and two seconds. However, it should be appreciated that the displaying of the information box is optional. In other embodiments, the mere act of hovering the mouse pointer over a search-engine link has no effect.

The information box can be of any suitable size and shape. In some embodiments, the information box may be a small box of text that is known in the art as a "Tooltip". The information box may display various kinds of information. In some embodiments, the information box can display a short message informing the user that clicking on the search-engine link will initiate a search for a search term associated with the search-engine link. The information box may also include a link to a document explaining the embedded search-engine link service to the user. In some embodiments, the information box can display an approximate number of hits that may be yielded by a search for the search term associated with the search-engine link. Furthermore, in some embodiments, the information box may display other suggested search terms related to the search term associated with the search-engine link and indicate that the other search terms are selectable to perform a search on those terms.

A user may decide to initiate the search for the search term associated with the search-engine link by selecting the search-engine link, e.g., by clicking on the search-engine link. The client application 218 (FIG. 2) detects and processes the selection at 806, and sends the selection of the link to the search-engine server 105 (FIG. 1) at 808, e.g., the client application 218 sends a request for a search using the parameters specified in the URL in the search-engine link to the search-engine server specified by the domain in the URL.

The search-engine server 105 (FIG. 1) subsequently receives the search request at 810. The search-engine server 105 runs the search using the search term and other specified parameters at 812. The search-engine server may perform various types of searches, depending on its configuration. In some embodiments, the search-engine server may be configured as a Web search-engine that performs a general Web search. In other embodiments, the search-engine server may be configured as shopping search-engine that performs searches for goods sold by online stores and for descriptions and/or reviews thereof. The search engine server 105 may perform one or more types of searches selected from the group consisting of: Web search, shopping search, groups search, news search, local search, domain-specific search, images search, directory search, and catalog search.

The search-engine server 105 (FIG. 1) locates the search results at 814, and sends them to the client 102 (FIG. 1) as a document (e.g., a web page) that includes links to other documents that list additional search results at 816. In some embodiments, if the search-engine server 105 provides a service where advertisements that are related to the search term are included alongside search results, the search results may also include advertisements.

The client 102 (FIG. 1) receives the search results at 818 and displays the search results to the user in the client application 218 (FIG. 2) at 820. The search results include links to the search hits and optionally advertisements. In some embodiments, the search results may be displayed in a pop-up window. In some embodiments, the search results may be displayed in a new window or the same window as the one that is displaying the document. In some embodiments, the search results may be displayed in the information box as described above.

It should be appreciated that, in other embodiments, some of the operations described above, in relation to FIGS. 6A-6B and 7A-7B, may be divided amongst the client 102 (FIG. 1), content server 106 (FIG. 1), and search-engine link provider 104 (FIG. 1) in a manner different than that described above. How the tasks are divided between client 102, content server 106 and search-engine link provider 104 may depend, in part, on the resources (e.g., CPU processing power, network bandwidth, and memory) required for each task.

The embodiments of the invention, as described above, give a user easier access to additional information regarding a document the user is viewing. The user can select a search-engine link to search for information related to the document, without having to navigate to a search engine page or typing in a search term manually. Furthermore, the user's attention is less likely to be diverted by conducting the search from the document the user is viewing.

The foregoing descriptions of specific embodiments of the present invention are presented for purposes of illustration and description. For example, any methods described herein are merely examples intended to illustrate one way of performing the invention. They are not intended to be exhaustive or to limit the invention to the precise forms disclosed. Obviously many modifications and variations are possible in view of the above teachings. Furthermore, if feasible, any single component described herein may be replaced with more than one of the same component, or multiple components may be incorporated into a single component. The embodiments were chosen and described in order to best explain the principles of the invention and its practical applications, to thereby enable others skilled in the art to best utilize the invention and various embodiments with various modifications as are suited to the particular use contemplated. Furthermore, the order of steps, tasks or operations in the method are not necessarily intended to occur in the sequence laid out. It is intended that the scope of the invention be defined by the following claims and their equivalents.

What is claimed is:

1. A method of processing a document to include embedded search engine links, comprising:
    at a computer system including one or more processors and memory storing one or more programs, the one or more processors executing the one or more programs to perform the operations of:
    receiving content from a remote computer, wherein said content forms at least part of a document;
    determining one or more search terms based on said content;
    generating one or more search engine links corresponding to at least some of the one or more search terms, wherein a respective search engine link is a link to invoke performance of a search by a search engine that is separate and distinct from the remote computer, wherein the respective search engine link is a link to the search engine, wherein the respective search engine link includes at least some of the one or more search terms, and wherein the search is based on respective search terms identified by the respective search engine link; and
    transmitting said one or more search engine links to the remote computer for embedding into said document.

2. The method of claim 1, further comprising, after said generating, parsing said content for said at least some of the one or more search terms.

3. The method of claim 2, further comprising, after said parsing:
    embedding said one or more search engine links into said content as one or more embedded search engine links, where each of said one or more embedded search engine links is associated with a search term of the one or more search terms, wherein selection of any of said one or more embedded search engine links by a user of the remote computer initiates a search for a search term associated with the selection; and
    transmitting said content containing said embedded search engine links to the remote computer.

4. The method of claim 3, wherein said embedding said one or more search engine links comprises highlighting a portion of said content associated with each of said one or more search engine links.

5. The method of claim 1, wherein the content is designated by information included in said document.

6. The method of claim 1, further comprising, after receiving a request from said remote computer to perform a search for a selected search term of said one or more search terms, performing a search using a search engine for said selected search term.

7. The method of claim 6, wherein the search engine is a web search engine.

8. The method of claim 6, wherein the search engine is selected from the set consisting of a news search engine, a shopping search engine, a local search engine, a web search engine, a groups search engine, and a combination of said search engines.

9. The method of claim 1, wherein said determining one or more search terms comprises:
    identifying one or more topics associated with said content; and
    generating the one or more search terms based on the one or more topics.

10. The method of claim 1, wherein said determining one or more search terms comprises:
    identifying one or more topics associated with said content;
    generating the one or more search terms based on the one or more topics; and
    ranking each respective search term of the one or more search terms according to one or more predefined criteria.

11. The method of claim 10, wherein the one or more predefined criteria comprise a metric of relevancy of each respective search term to said content.

12. The method of claim 10, wherein the one or more predefined criteria comprise an advertisement revenue generation potential of each respective search term.

13. The method of claim 12, wherein the advertisement revenue generation potential of each respective search term is based on a number of advertisements associated with the respective search term.

14. The method of claim 12, wherein the advertisement revenue generation potential of each respective search term is based on a highest cost-per-click amongst advertisements associated with a search for the respective search term.

15. A method of embedding search engine links into a document, comprising:
   at a computer system including one or more processors and memory storing one or more programs, the one or more processors executing the one or more programs to perform the operations of:
   invoking one or more procedures to initiate embedding of search engine links into content that forms at least part of a document;
   transmitting said content to a remote computer, wherein said transmitting is in response to said invoking;
   receiving one or more search engine links from the remote computer, wherein said one or more search engine links are generated based on one or more search terms associated with said content, wherein a respective search engine link is a link to invoke performance of a search by a search engine that is separate and distinct from the remote computer, wherein the respective search engine link is a link to the search engine, wherein the respective search engine link includes at least some of the one or more search terms, and wherein the search is based on respective search terms identified by the respective search engine link; and
   inserting said one or more search engine links into said document.

16. The method of claim 15, wherein said inserting comprises:
   embedding said one or more search engine links into said document as one or more embedded search engine links, where each of said one or more embedded search engine links is associated with a search term of the one or more search terms, wherein selection of any of said one or more embedded search engine links initiates a search for a search term associated with the selection.

17. The method of claim 16, wherein said inserting further comprises parsing the content for the one or more search terms.

18. The method of claim 16, further comprising rendering the document with said one or more embedded search engine links at a client.

19. The method of claim 16, further comprising:
   associating an information box with each of said one or more embedded search engine links; and
   displaying the information box whenever a pointer is placed over one of said one or more embedded search engine links.

20. The method of claim 19, wherein the information box displays a count of results of a search for a search term associated with the one of said one or more search engine links.

21. The method of claim 19, wherein the information box displays a list of other suggested search terms related to a search term associated with the one of said one or more search engine links.

22. The method of claim 19, wherein the information box displays a search term associated with the one of said one or more search engine links.

23. A method of embedding search engine links into a document, comprising:
   at a computer system including one or more processors and memory storing one or more programs, the one or more processors executing the one or more programs to perform the operations of:
   invoking one or more procedures to initiate embedding of search engine links into a first content that forms at least part of a document;
   transmitting the first content, wherein said transmitting is in response to said invoking;
   receiving a second content including one or more embedded search engine links from the remote computer, wherein said one or more embedded search engine links are associated with one or more search terms associated with the first content, wherein a respective search engine link is a link to invoke performance of a search by a search engine that is separate and distinct from the remote computer, wherein the respective search engine link is a link to the search engine, wherein the respective search engine link includes at least some of the one or more search terms, and wherein the search is based on respective search terms identified by the respective search engine link; and
   replacing the first content in the document with the second content including said one or more embedded search engine links.

24. A system for processing a document to include embedded search engine links, comprising:
   one or more processors;
   memory; and
   one or more programs stored in the memory, the one or more programs comprising instructions to:
   receive content from a remote computer, wherein said content forms at least part of a document;
   determine one or more search terms based on said content;
   generate one or more search engine links corresponding to at least some of the one or more search terms, wherein a respective search engine link is a link to invoke performance of a search by a search engine that is separate and distinct from the remote computer, wherein the respective search engine link is a link to the search engine, wherein the respective search engine link includes at least some of the one or more search terms, and wherein the search is based on respective search terms identified by the respective search engine link; and
   transmit said one or more search engine links to the remote computer for embedding into said document.

25. A system for embedding search engine links into a document, comprising:
   one or more processors;
   memory; and
   one or more programs stored in the memory, the one or more programs comprising instructions to:
   transmit content to a remote computer, wherein said content forms at least part of a document;
   receive one or more search engine links from the remote computer, wherein said one or more search engine links are generated based on one or more search terms associated with said content, wherein a respective search engine link is a link to invoke performance of a search by a search engine that is separate and distinct from the remote computer, wherein the respective search engine link is a link to the search engine, wherein the respective search engine link includes at least some of the one or more search terms, and wherein the search is based on respective search terms identified by the respective search engine link; and insert said one or more search engine links into said document.

26. A computer readable storage medium having stored thereon data representing sequences of instructions, which when executed by a computer, cause the computer to:

receive content from a remote computer, wherein said content forms at least part of a document;

determine one or more search terms based on said content;

generate one or more search engine links corresponding to at least some of the one or more search terms, wherein a respective search engine link is a link to invoke performance of a search by a search engine that is separate and distinct from the remote computer, wherein the respective search engine link is a link to the search engine, wherein the respective search engine link includes at least some of the one or more search terms, and wherein the search is based on respective search terms identified by the respective search engine link; and transmit said one or more search engine links to the remote computer for embedding into said document.

27. A computer readable storage medium having stored thereon data representing sequences of instructions, which when executed by a computer, cause the computer to:

invoke one or more procedures to initiate embedding of search engine links into content that forms at least part of a document;

transmit said content to a remote computer, wherein said transmitting is in response to said invoking;

receive one or more search engine links from the remote computer, wherein said one or more search engine links are generated based on one or more search terms associated with said content, wherein a respective search engine link is a link to invoke performance of a search by a search engine that is separate and distinct from the remote computer, wherein the respective search engine link is a link to the search engine, wherein the respective search engine link includes at least some of the one or more search terms, and wherein the search is based on respective search terms identified by the respective search engine link; and insert said one or more search engine links into said document.

* * * * *